(12) United States Patent
Chang

(10) Patent No.: US 8,585,946 B2
(45) Date of Patent: Nov. 19, 2013

(54) METHOD FOR MAKING HEAT-INSULATIVE PAPER CONTAINERS AND THE PRODUCTS

(75) Inventor: Ching-Wen Chang, Taichung (CN)

(73) Assignee: Rich Cup Bio-Chemical Technology Co., Ltd., Taichung (TW)

( * ) Notice: Subject to any disclaimer, the term of this patent is extended or adjusted under 35 U.S.C. 154(b) by 513 days.

(21) Appl. No.: 13/059,939

(22) PCT Filed: Oct. 23, 2008

(86) PCT No.: PCT/CN2008/001788
§ 371 (c)(1),
(2), (4) Date: Feb. 18, 2011

(87) PCT Pub. No.: WO2010/022548
PCT Pub. Date: Mar. 4, 2010

(65) Prior Publication Data
US 2011/0152049 A1 Jun. 23, 2011

(30) Foreign Application Priority Data
Aug. 28, 2008 (CN) .......................... 2008 1 0147548

(51) Int. Cl.
*B29C 44/06* (2006.01)
*B31B 1/00* (2006.01)

(52) U.S. Cl.
USPC .............. 264/46.4; 264/46.9; 264/51; 493/85

(58) Field of Classification Search
None
See application file for complete search history.

(56) References Cited

U.S. PATENT DOCUMENTS

| | | | | |
|---|---|---|---|---|
| 3,658,615 A | * | 4/1972 | Amberg | 156/218 |
| 4,060,577 A | * | 11/1977 | Collins | 264/45.4 |
| 5,326,517 A | * | 7/1994 | Yaita et al. | 264/51 |
| 5,490,631 A | * | 2/1996 | Iioka et al. | 229/403 |
| 5,993,705 A | * | 11/1999 | Grishchenko et al. | 264/46.4 |
| 6,139,665 A | * | 10/2000 | Schmelzer et al. | 156/78 |
| 2002/0041046 A1 | | 4/2002 | Hartjes et al. | |
| 2004/0238989 A1 | * | 12/2004 | Debraal et al. | 264/46.4 |
| 2006/0005917 A1 | * | 1/2006 | Alvarez | 156/215 |
| 2007/0166468 A1 | | 7/2007 | Chang et al. | |

FOREIGN PATENT DOCUMENTS

| | | |
|---|---|---|
| CN | 101249732 A | 8/2008 |
| JP | 2008105747 A | 5/2008 |
| TW | I271364 | 1/2007 |

\* cited by examiner

*Primary Examiner* — Benjamin Schiffman
(74) *Attorney, Agent, or Firm* — Muncy, Geissler, Olds & Lowe, PLLC

(57) ABSTRACT

A method for making heat-insulated paper containers and the products made by the same. The method includes steps of: (a) mixing and blending polyethylene terephthalate or polypropylene with an adhesive to form a polymer material; (b) heating and extruding the polymer material with an extruder machine to form a film and coating a surface of paper with the film; (c) cooling and laminating the paper with a laminating roller; (d) continuously coating another surface of the paper with a foam material; and then furling the paper after drying; and cutting the paper into a semi-product and then molding into a paper container; (e) heating the foam material with a heating device. The method can enhance the foam uniformity and the production rate, and decrease the defective rate.

20 Claims, 8 Drawing Sheets

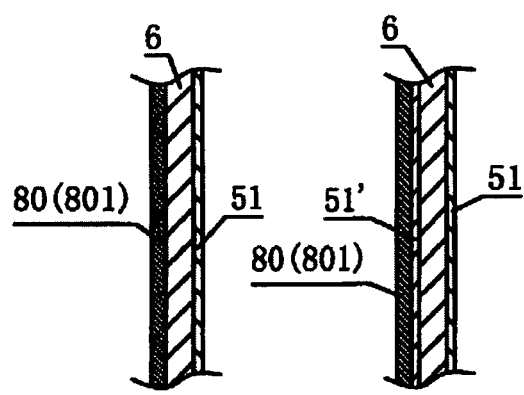
FIG. 2-A  FIG. 3-A

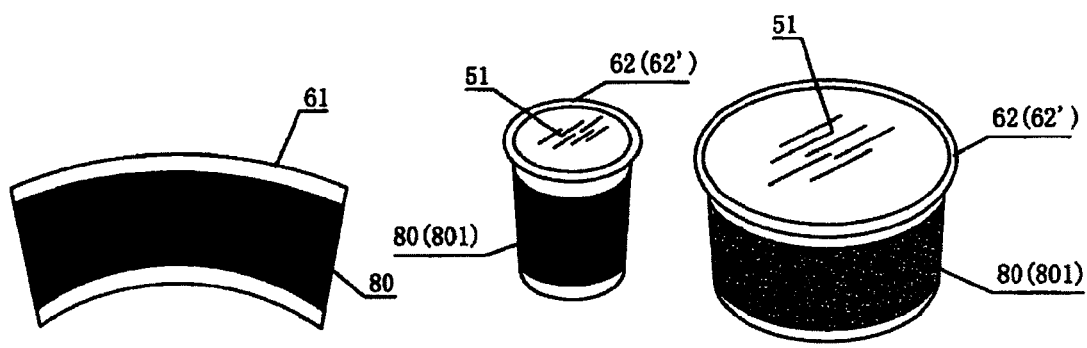
FIG. 4-A   FIG. 4-B   FIG. 4-C

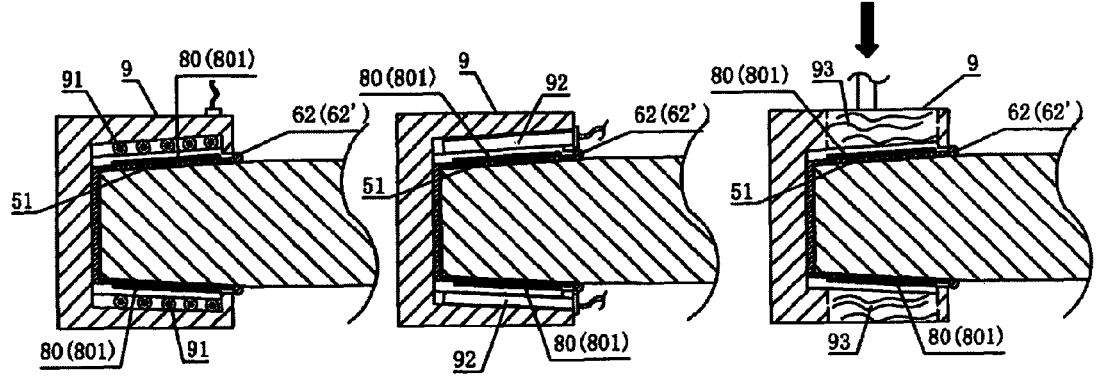
FIG. 5-A   FIG. 5-B   FIG. 5-C

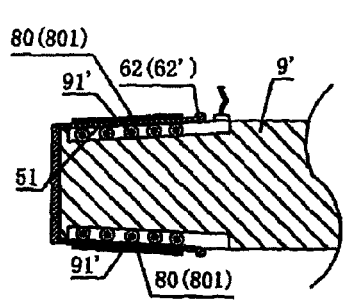 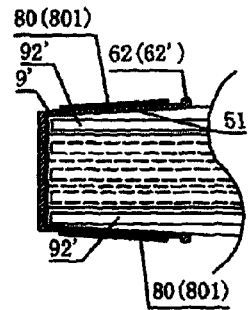 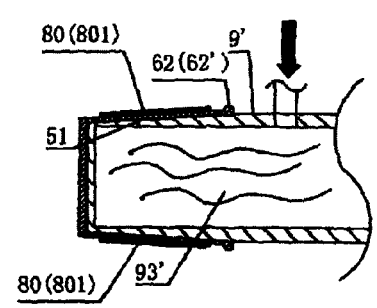
FIG. 6-A  FIG. 6-B  FIG. 6-C

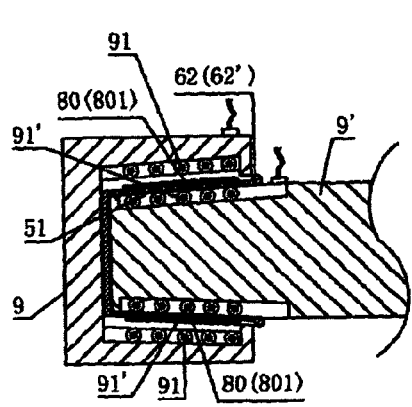 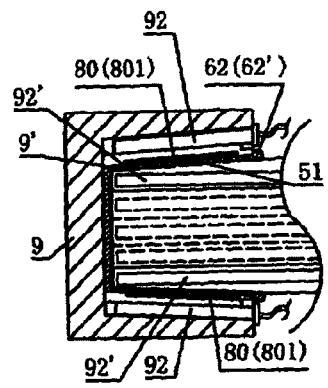 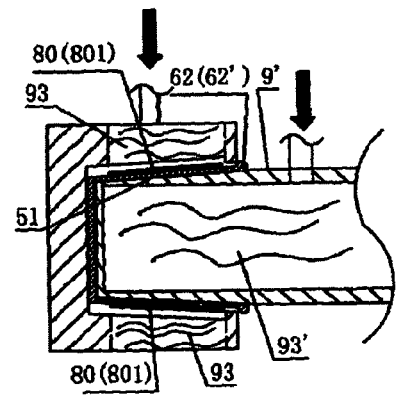
FIG. 7-A  FIG. 7-B  FIG. 7-C

METHOD FOR MAKING HEAT-INSULATIVE PAPER CONTAINERS AND THE PRODUCTS

BACKGROUND OF THE INVENTION

1. Field of the Invention

The present invention relates to a method for making paper containers, and more particularly to a method for making heat-insulated paper containers, a heating device for executing the method, and the heat-insulated paper containers made by the method, which relate to a field of commodity processing.

2. Description of the Prior Art

Previously, the applicant disclosed a method for making heat-insulated paper containers, as shown in TW 271364, wherein the liquid adhesive and thermo-expandable powder are mixed as the compound coating; and then coat the paper container with the compound coating, or coat the semi-product with the compound coating and then molding into paper the container; and after that, heat the compound coating in the temperature between 100° C. and 140° C. so as to make the compound coating foam as a foamed layer adhering to the outer surface of the paper container. As a result, the paper container is heat-insulated and heat-prevented. However, the inner film of the paper container is coated with polyethylene. To prevent the inner film from being damaged by high temperature, the heating temperature and the compound coating are limited. Further, the heating temperature and the compound coating should correspond to each other in order to make the heat-insulated paper container.

In addition, conventional heat-insulated paper containers are coated with a foam layer which is compounded by low-melting-point thermoplastic synthetic resin. According to the difference on the density (0.91~0.95 g/cm$^3$) of the resin and the thickness of the foamed layer before foaming, the melting point of the foamed layer should be about between 105° C. and 135° C. But it will take about 2 to 4 minutes to reach the melting point. In other words, it is uneconomical to foam for such a long time.

SUMMARY OF THE INVENTION

The present invention is to obviate or at least mitigate the following disadvantages:

(1) The production of the above mentioned paper container is limited to the types of the compound coating. If the compound coating requires a high temperature or a long time to foam, the inner film of the paper container will be damaged before the foam layer foaming, so that the paper container will become deformed and some toxic materials will be released from the inner film.

(2) The inner film of conventional paper containers are coated with polyethylene. However, the polyethylene cannot be heated in a microwave oven or an oven, or the inner film will be damaged and then release toxic materials. As a result, the conventional paper containers are not environmental friendly and safe.

(3) The foamed layer on the outer surface of conventional heat-insulated paper containers is often made by low-melting-point thermoplastic synthetic resin. The resin needs a long time to foam, so the inner film of the paper container is prone to be damaged and release toxic materials.

(4) If the inner film of said paper containers is coated by high-temperature resistant material, the inner film will not be damaged during heating the foamed layer. However, it takes much time to heat the foamed layer, so the production speed is decreased, and the production cost is higher as well.

(5) Because the foamed layer of conventional heat-insulated paper containers fails to foam uniformly, the paper containers become deformed when being heated in an oven. As a result, the defective rate of the heat-insulated paper containers is high.

To resolve said disadvantages, the present invention provides a method for making heat-insulated paper containers, including steps of:

a) mixing and blending polyethylene terephthalate or polypropylene with an adhesive to form a polymer material;

b) heating and extruding the polymer material with an extruder machine to form a film, and coating a surface of paper with the film;

c) cooling and laminating the paper with a laminating roller;

d) continuously coating another surface of the paper, which is uncoated with the film, with a foam material in a manner of spraying, rolling or color printing, and then furling the paper after drying, and after that, cutting the paper into a semi-product and then molding into a paper container; otherwise, molding the paper into a paper container, and then coating an outer surface of the paper container with a foam material;

e) heating the foam material with a heating device for foam molding, and after that, a heat-insulated paper container being completed.

To make it better, two surfaces of the paper can be coated with the film, and then mold the paper into a paper container.

In the step a, the adhesive is an oil-based polyurethane resin, and a weight of the polyurethane resin accounts for 5% to 20% of a total weight of the polymer material.

In the step e, a heating temperature for foam molding is between 80° C. and 200° C.; otherwise the heating temperature is above 200° C. And the foam molding by heating takes 1 to 5 seconds; The foam molding by heating is covering the outer surface of the paper container with the heating device, and to heat the foam material to foam instantaneously in a manner of directly touching the foam material with the heating device or disposing the heating device closely to the foam material, and then separating the paper container from the heating device immediately after foaming; otherwise, disposing the heating device closely to an inner surface of the paper container so as to instantly heat the inner surface without touching it, so that the foam material on the outer surface foams instantaneously by the heat transmitted from the inner surface, and then separating the paper container from the heating device immediately after foaming.

In the step e, an inner surface of the heating device is formed corresponding to a shape of the outer surface of the paper container, and the heating device is adapted to cover the foam material on the outer surface of the paper container; otherwise, an outer surface of the heating device is formed corresponding to a shape of an inner surface of the paper container, and the heating device is adapted to be disposed inside of the paper container; wherein the heating device is disposed with one of the devices, which include heating wires, infrared lamps, and heat conductors, so as to transmit heat.

To improve the production efficiency, the heating device can be disposed after the last section of a paper container molding assembly line, so that the heating device makes one of the processes which include covering an outer surface of the paper container, entering inside of the paper container, and covering the outer surface and entering inside of the paper container simultaneously. Thereby, the heat-insulated paper containers can be produced efficiently and automatically.

1. The present invention is mixing and blending polyethylene terephthalate or polypropylene with an adhesive so as to form a polymer material; extruding and heating the polymer material with an extruder machine to form a film, and then coating a surface of paper with the film; cooling and laminating the paper with a laminating roller, so that the paper is coated with the polypropylene film or polyethylene terephthalate film layer; after that, continuously coating another surface of the paper with a foam material, and molding the paper into a paper container; otherwise, molding the paper into a paper container, and then coating an outer surface of the paper container with a foam material; heating the foam material in a temperature according to the type of the foam material, wherein the foam material does not deteriorate in the temperature of about above 200°C., so that it takes a short time to heat the foam material which is coated on the paper container for foam molding. The inner film of the paper container is coated with polyethylene terephthalate or polypropylene which is not damaged in the high temperature. Consequently, it is environmental friendly and safe.

2. Two surfaces of the paper can be coated with polyethylene terephthalate or polypropylene film layer, and one of the surfaces is coated with a foam material, and then molding the paper into a paper container. Thereby, the foam material is combined with and adhered to the polyethylene terephthalate or polypropylene film layer without directly touching the outer surface of the paper container when heating. As a result, the paper container does not become deformed when heating.

3. In the present invention, the heating device can be disposed closely to the outer surface or the inner surface, or the outer and the inner surface of the paper container so as to instantaneously heat the foam material by directly touching it or not. And then separate the heating device from the paper container after foaming, so that the foam material on the paper container can foam rapidly. As a result, it can foam uniformly and enhance the production efficiency.

4. The heating device applied in the present invention can instantaneously heat the foam material in 1 to 5 seconds. Thereby, it can increase the production speed and decrease the defective rate.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2-A is a sectional drawing showing a complete product or a semi-product of a first preferred embodiment of the present invention;

FIG. 3-A is a sectional drawing showing a complete product or a semi-product of a second preferred embodiment of the present invention;

FIG. 4-A is a schematic drawing showing a semi-product made by the method of the present invention;

FIGS. 4-B & 4-C are schematic drawings showing a complete product made by the method of the present invention;

FIG. 5-A is a schematic drawing showing a heating device of the present invention, wherein an outer surface of the container is heated by a heating device which is disposed with heating wires;

FIG. 5-B is a schematic drawing showing a heating device of the present invention, wherein an outer surface of the container is heated by a heating device which is disposed with infrared lamps;

FIG. 5-C is a schematic drawing showing a heating device of the present invention, wherein an outer surface of the container is heated by a heating device which is disposed with heat conductors;

FIG. 6-A is a schematic drawing showing a container of the present invention, wherein an inner surface of the container is heated by a heating device which is disposed with heating wires;

FIG. 6-B is a schematic drawing showing a container of the present invention, wherein an inner surface of the container is heated by a heating device which is disposed with infrared lamps;

FIG. 6-C is a schematic drawing showing a container of the present invention, wherein an inner surface of the container is heated by a heating device which is disposed with heat conductors;

FIG. 7-A is a schematic drawing showing a container of the present invention, wherein an inner and an outer surface of the container are heated by a heating device which is disposed with heating wires;

FIG. 7-B is a schematic drawing showing a container of the present invention, wherein an inner and an outer surface of the container are heated by a heating device which is disposed with infrared lamps;

FIG. 7-C is a schematic drawing showing a container of the present invention, wherein an inner and an outer surface of the container are heated by a heating device which is disposed with heat conductors.

DETAILED DESCRIPTION OF THE PREFERRED EMBODIMENTS

Figure 1:
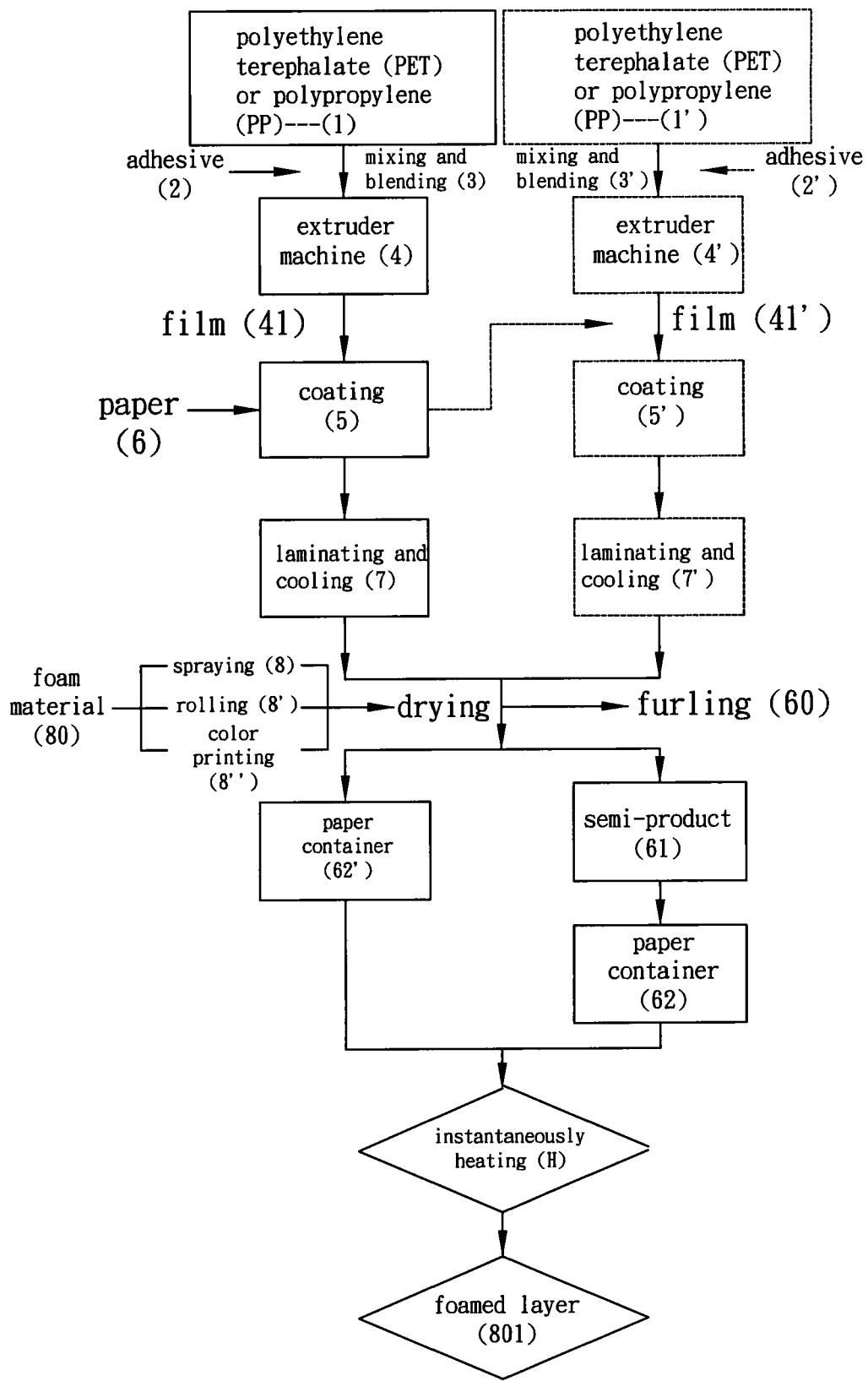
FIG. 1 is a flow chart showing the method of the present invention.
Figure 2:
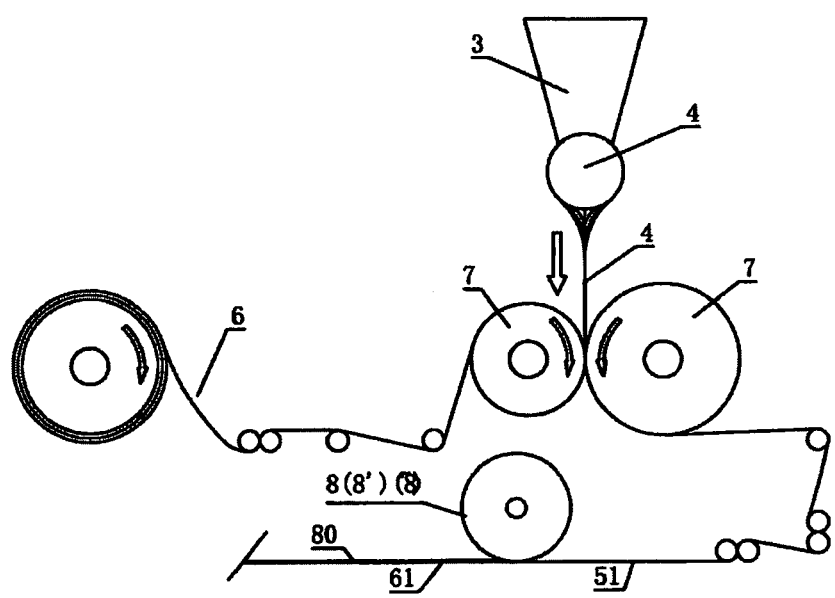
FIG. 2 is a schematic drawing showing a production device of a first preferred embodiment of the present invention.

Please refer to FIG. 1 and FIG. 2. A method of the present invention includes mixing and blending polyethylene terephthalate or polypropylene 1 with an adhesive 2 to form a polymer material, wherein the adhesive 2 is an oil-based polyurethane resin, and a weight of the polyurethane resin accounts for 5% to 20% of a total weight of the polymer material; heating and extruding the polymer material with an extruder machine 4 to form a film 41, and then coating 5 a surface of paper 6 with the film 41; cooling and laminating 7 the paper 6 with a laminating roller 7, so that the paper is coated with a polyethylene terephthalate film layer or polypropylene film layer 51; continuously coating another surface of the paper 6 with a foam material 80 in a manner of spraying 8, rolling 8' or color printing 8", and then furling 60 the paper after drying, and after that, cutting the paper into a semi-product 61 and then molding into a paper container 62; otherwise, molding the paper into paper container 62', and then coating an outer surface of the paper container 62' with a foam material in a manner of praying 8, rolling 8' or color printing 8"; instantaneously heating H the foam material 80 in a temperature according to the type of the foam material 80. The polyethylene terephthalate or polypropylene film layer 51 can resist the temperature of above 200° C. when heating the foam material 80, so that the foam material 80 takes a short time to foam as a foamed layer 801 after instantaneous heating H (as shown in FIG. 2-A). And the inner surface of the paper containers 62, 62' are coated with the polyethylene terephthalate or polypropylene film layer 51 which can resist high temperature, so that the paper containers 62, 62' are environmental friendly and non-toxic.

Figure 3:
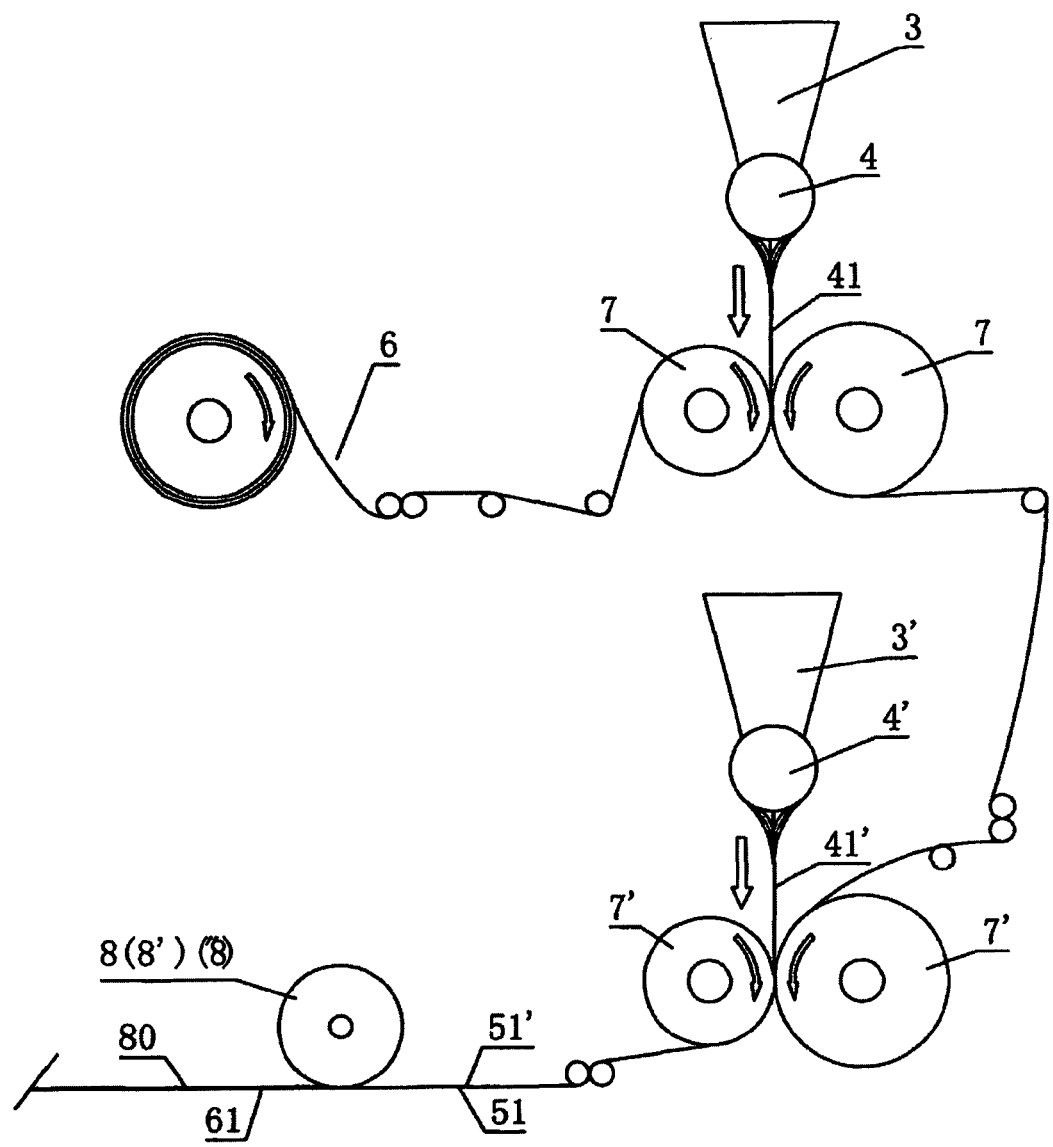
FIG. 3 is a schematic drawing showing a production device of a second preferred embodiment of the present invention.

Please refer to FIG. 1 and FIG. 3. According to said method, two surfaces of the paper 6 can be respectively coated with a film 51, 51'. The paper container can be made in steps of mixing and blending 3 polyethylene terephthalate or polypropylene 1, 1' with the adhesive 2, 2' to form a polymer material, as shown in FIG. 3; extruding the polymer material to form a film 41, 41' with a extruding machine 4, 4'; coating two surfaces of the semi-product 61 with the film 41, 41' so as to form a film layer 51, 51'; coating one of the surfaces with the foam material 80, and furling 60 the paper 6 after drying, and then cutting the paper 6 into the semi-product 61 (as shown in FIG. 4-A) and molding into a paper container 61 (as shown in FIG. 4-B,C), or directly molding the paper 6 into a paper container 62 (as shown in FIG. 4-B,C); otherwise, molding the paper, which is coated with polyethylene terephthalate or polypropylene 1 film layer 51, 51' on its two surfaces, into the paper container 62, and after that, coating the outer surface of the paper container with foam material 80. Thereby, the foam material 80 will be combined and adhered to the polyethylene terephthalate or polypropylene film layer 51' without directly adhering to the outer surface of the paper container, as shown in FIG. 3-A, so that the foamed layer 801 formed by heating H does not damage the film and become deformed.

Please refer to FIG. 5-A to 5-C and FIG. 6-A to 6-C. The foam material 80 which is coated on the outer surface of the paper container 62, 62', can be heated by a heating device 9, 9'. The heating device 9, 9' can be disposed closely to the outer surface of the paper container 62 (as shown in FIG. 5-A to FIG. 5-C) or to the inner surface of the paper container 62 (as shown in FIG. 6-A to FIG. 6-C). And the foam material 80 can be heated instantaneously in a manner of directly touching the foam material 80 with the heating device 9, 9' or disposing the heating device 9, 9' closely to the foam material 80, or disposing the heating device 9, 9' closely to the inner surface of the paper container 62, 62' without touching the foam material 80, and the foam material 80 on the outer surface of the container 62, 62' instantly foaming to form as a foamed layer 801 by the heat transmitted from the inner surface, and after that, separating the paper container 62, 62' from the heating device 9, 9', so that the foamed layer 801 of the paper container can foam rapidly so as to enhance the production efficiency.

The heating device 9, 9' can be disposed with heating wires 91, 91' (as shown in FIG. 5-A and FIG. 6-A), infrared lamps 92, 92' (as shown in FIG. 5-B and FIG. 6-B), or heat conductors (as shown in FIG. 5-C and FIG. 6-C). The heating temperature can be controlled between 80° C. and 200° C., or above 200° C., and the heating part of the heating device 9, 9' is formed corresponding to a shape of the outer surface or the inner surface of the paper container 62. And the foam material 80 can be covered by the heating device 9, 9' so as to heat the foam material 80 in a manner of directly touching it or being disposed closely to it, as shown in FIG. 5-A to FIG. 5-C; otherwise, the heating device 9, 9' can be disposed closely to the inner surface of the paper container 62 so as to transmit the heat to the foam material 80 on the outer surface, as shown in FIG. 6-A to 6-C. Thereby, the foamed layer 801 is then formed, and the polyethylene terephthalate or polypropylene film layer 51, 51', which is coated on the inner and outer surface of the paper container 62, does not be damaged when heating.

Please refer to FIG. 7-A to 7-C. Said heating device 9, 9' can cover the foam material 80 on the outer surface of the paper container 62, 62' and be disposed closely to the inner surface of the paper container 62, 62' in the same time, so that it is much faster to heat the foam material 80 to foam. Thereby, the object of increasing production efficiency and improving the foam uniformity can be achieved.

The heating wires 91, 91' (as shown in FIG. 5-A and FIG. 6-A), infrared lamps 92, 92' (as shown in FIG. 5-B and FIG. 6-B), or heat conductors (as shown in FIG. 5-C and FIG. 6-C) can be selectively disposed on the heating device according to the characteristics of the foam material 80 of the paper container 62, 62'. Thereby, the time for foam molding can be shortened to 1 to 5 seconds, so that the production efficiency can be enhanced, and the defection rate can be reduced.

Said heating device 9, 9' can be disposed after the last section of a paper container molding assembly line, which is a conventional production apparatus, so as to produce rapidly and automatically.

What is claimed is:

1. A method for making heat-insulated paper containers by coating a surface of paper with a film layer, and then continuously coating another surface of the paper with a foam material in a manner of spraying, rolling or color printing, and then furling the paper after drying, and after that, cutting the paper into a semi-product and then molding into a paper container; wherein the method comprising:

mixing and blending polyethylene terephthalate or polypropylene with an adhesive to form a polymer material; heating and extruding the polymer material with an extruder machine to form a film; coating a surface of paper with the film so as to form as the film layer which is to be an inner surface of the paper container;

cooling and laminating the paper, which is coated with the film, with a laminating roller;

instantaneously heating the foam material on an outer surface of the paper container with a heating device in a manner of directly touching the foam material with the heating device or disposing the heating device closely to the foam material, so that the foaming time of the foam material is shortened, the foam material foams uniformly, and the film layer is prevented from being damaged by high temperature when heating.

2. The method of claim 1, wherein the adhesive is an oil-based polyurethane resin, and a weight of the polyurethane resin accounts for 5% to 20% of a total weight of the polymer material.

3. The method of claim 1, wherein two surfaces of the paper are coated with the film; one of the surfaces of the paper is further coated with the foam material, and then mold the paper into the paper container.

4. The method of claim 1, wherein a heating temperature for foam molding is between 80° C. and 200° C.

5. The method of claim 1, wherein the foam molding by heating takes 1 to 5 seconds.

6. The method of claim 1, wherein the foam molding by heating is covering the outer surface of the paper container with the heating device, and heating the foam material to foam instantaneously in a manner of directly touching the foam material with the heating device or disposing the heating device closely to the foam material, and then separating the paper container from the heating device immediately after foaming.

7. The method of claim 6, wherein the heating device is disposed with one of the devices, which include heating wires, infrared lamps, and heat conductors, so as to transmit heat.

8. The method of claim 1, wherein an inner surface of the heating device is formed corresponding to a shape of the outer surface of the paper container, and the heating device is adapted to cover the foam material on the outer surface of the paper container.

9. The method of claim 1, wherein the heating device is disposed after a last section of a paper container molding assembly line, so that the heating device carries out a process which includes covering the outer surface of the paper container, entering inside of the paper container, and covering the outer surface and entering inside of the paper container simultaneously.

10. The method of claim 1, wherein the foam molding by heating is disposing the heating device closely to the inner surface of the paper container so as to instantly heat the inner surface without touching it, so that the foam material on the outer surface foams instantaneously by the heat transmitted from the inner surface, and then separating the paper container from the heating device immediately after foaming.

11. The method of claim 1, wherein an outer surface of the heating device is formed corresponding to a shape of the inner surface of the paper container, and the heating device is adapted to be disposed inside of the paper container.

12. A method for making heat-insulated paper containers by molding a paper into a paper container, and then coating an outer surface of the paper container with a foam material; heating the foam material so as to make the foam material foam directly on the surface of the paper, so that the outer surface of the paper container having an effect of heat insulation; wherein the method comprising:
    mixing and blending polyethylene terephthalate or polypropylene with an adhesive to form a polymer material; heating and extruding the polymer material with an extruder machine to form a film; coating a surface of paper with the film so as to form as the film layer which is to be an inner surface of the paper container;
    cooling and laminating the paper, which is coated with the film, with a laminating roller;
    instantaneously heating the foam material on an outer surface of the paper container with a heating device in a manner of directly touching the foam material with the heating device or disposing the heating device closely to the foam material, so that the foaming time of the foam material is shortened, the foam material foams uniformly, and the film layer is prevented from being damaged by high temperature when heating.

13. The method of claim 12, wherein the adhesive is an oil-based polyurethane resin, and a weight of the polyurethane resin accounts for 5% to 20% of a total weight of the polymer material.

14. The method of claim 12, wherein a heating temperature for foam molding is between 80° C. and 200° C., and the foam molding by heating takes 1 to 5 seconds.

15. The method of claim 12, wherein the foam molding by heating is covering the outer surface of the paper container with the heating device, and heating the foam material to foam instantaneously in a manner of directly touching the foam material with the heating device or disposing the heating device closely to the foam material, and then separating the paper container from the heating device immediately after foaming.

16. The method of claim 15, wherein the heating device is disposed with one of the devices, which include heating wires, infrared lamps, and heat conductors, so as to transmit heat.

17. The method of claim 12, wherein the foam molding by heating is disposing the heating device closely to the inner surface of the paper container so as to instantly heat the inner surface without touching it, so that the foam material on the outer surface foams instantaneously by the heat transmitted from the inner surface, and then separating the paper container from the heating device immediately after foaming.

18. The method of claim 12, wherein an inner surface of the heating device is formed corresponding to a shape of the outer surface of the paper container, and the heating device is adapted to cover the foam material on the outer surface of the paper container.

19. The method of claim 12, wherein an outer surface of the heating device is formed corresponding to a shape of the inner surface of the paper container, and the heating device is adapted to be disposed inside of the paper container.

20. The method of claim 12, wherein the heating device is disposed after a last section of a paper container molding assembly line, so that the heating device carries out a process which includes covering the outer surface of the paper container, entering inside of the paper container, and covering the outer surface and entering inside of the paper container simultaneously.

* * * * *